D. P. BONNELL.
Mill Bolt.
No. 6,648.             Patented Aug. 14, 1849.
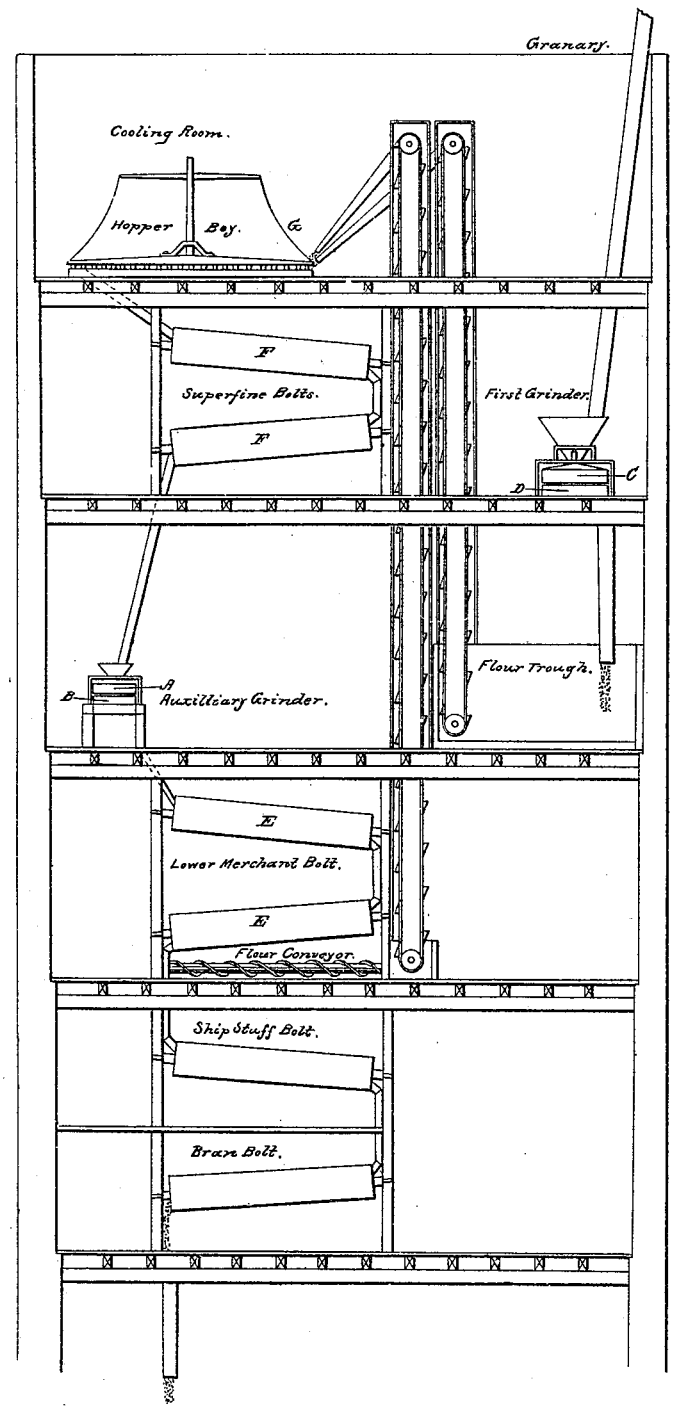

UNITED STATES PATENT OFFICE.

DAVID P. BONNELL, OF TECUMSEH, MICHIGAN.

PROCESS OF FLOURING.

Specification forming part of Letters Patent No. 6,648, dated August 14, 1849; Reissued July 5, 1853, No. 245.

*To all whom it may concern:*

Be it known that I, DAVID P. BONNELL, of Tecumseh, in the county of Lenawee and State of Michigan, have invented or discovered a new and useful improvement in the mode of manufacturing wheat and other grain into flour, by which a greater yield of flour of an improved quality is produced from a given quantity of grain than has heretofore been produced, which is described as follows, reference being had to the annexed drawing, making part of this specification, being a vertical section of a mill.

In the present mode of grinding wheat into flour about 4 bushels and twenty five pounds of grain are required to produce a barrel of superfine flour and the grinding process is so very defective that the flour is much injured and some of the most nutritious portions of the grain are incorporated with the offal. Besides, for want of a second grinding of the offal which is provided for in my method, the moisture is in part retained in the flour—it is thereby liable to turn sour in warm weather and is moreover difficult to raise in making it into bread.

My invention or discovery and improvement is designed to effect a saving of grain and an improvement in the flour, by producing a barrel of superfine flour of an improved quality from twenty five pounds less wheat than by the old process, by regrinding the offal, thereby evaporating the moisture of the grain or farina and by preventing the starchy portions of the grain from being ground too fine, save a large portion of the gluten of the grain and regrind it and mix it with the superfine flour by which very important results are produced, as will hereafter be described.

Before stating my improved mode of manufacturing wheat into flour, I will briefly explain the method now practised by our millers in reducing the wheat to flour.

The grain after being properly cleaned is ground to nearly as uniform fineness as possible by passing it between the surfaces of the mill stones while under a motion of about 150 or 200 revolutions per minute, which grinds the starch of the wheat too fine, and the gluten not sufficiently fine, as will hereafter be explained. The meal is then thrown into the cooling room in a mass, where it is stirred, aired, cooled, and dried. It is then drawn into two or more fine bolts of the usual construction and the flour, which is sufficiently pulverized, is sifted and discharged into the apartment for superfine flour. The remainder is then passed into two more bolts of a coarser cloth or mesh through which the flour is bolted or sifted and sent back to the cooling room to be mixed with the fine flour therein, so that a portion of it shall be incorporated with the superfine flour. The remainder of the stuffs is then passed into other bolts which separate it into middlings, shipstuffs, shorts, and bran. By this process of milling there will be about 69 pounds of offal to each barrel of flour. There will also be incorporated with, and attached to the waste stuffs or offal, a large quantity of the glutinous and nutritious properties which ought to be obtained and put into the superfine flour, in order to improve its quality and quantity. Recent experiments have shown that there are at least 3 times the quantity of gluten contained in one thousand pounds of bran, than in the same quantity of flour; and it is now, I believe, universally admitted, that the greater amount of gluten, flour contains, the greater amount of good bread will be obtained.

Millers well understanding this fact have long been endeavoring to obtain the greatest amount of pure flour from a given quantity of wheat and have consequently resorted to high and close grinding, dusting, and other operations; but without being able to accomplish the desired object; for, it is discovered that very high and close grinding of the wheat, in the first instance, reduces the starch to such a degree of fineness as to destroy the angular and granular quality that it should possess, and to injure the flour materially; causing it in the bolting process, from its fineness and adhesiveness and ready admixture with the gluten, to clog the meshes of the first bolting cloths; and thus retard the bolting operation; necessarily requiring the miller to resort to other means to separate the flour from the bran. Besides all this a large portion of the fine flour is made to adhere to the bran and is carried off with it and is thus lost to the superfine portion or barrel, the gluten causing the close adherence of a portion of the starch to the bran, in connection with the gluten itself.

Now, after long experience as a practical miller and much observation and study as to the components, nature, and character of wheat, I have discovered a remedy for the above named evils, being in fact a process by which I produce a barrel of superfine flour of a better quality for all uses than heretofore, from a less quantity of wheat or grain than is now required to produce a like quantity of flour.

My improved process consists in taking (after the first grinding and bolting operations in sifting the superfine flour from the ground stuffs) all the offal as it leaves the common merchant bolts F and instead of passing it through the succeeding coarser bolts, as is usual, subjecting it immediately and continuously to a second grinding between an auxiliary pair of stones A, B, running at a higher speed than the main stones C D, say at the rate of 320 revolutions per minute by which the "stuffs" will nearly all be reduced to the same degree of fineness as the portion previously passed through the "merchant bolts." The second grinding being thus completed, the "stuffs" are conducted to the "lower merchant bolts" E (or the dusters, if preferred) and such portion of the flour is bolted as the miller thinks proper to send back to the "cooler," G, to be mixed with the "stuffs" that are to be passed through the upper merchant bolts F to produce superfine flour, thus saving the glutinous, saccharine and most nutritious and valuable portions of the grain and mixing them with the superfine starchy particles of the flour.

This method I have ascertained, from experience, not only improves the quality of the flour by rendering it more nutritious, less liable to sour when packed for transportation in warm weather, and more easily raised during the process of making it into bread; but greatly increases the quantity of superfine flour from the same given quantity of wheat over that produced by the old method. The remaining "stuffs" that pass from the lower "merchant bolts" E are separated for "feeds" in the usual manner.

By the old method of grinding and bolting there are four kinds of products—"superfine," "middlings," "shorts," and "bran," so that a portion of the most nutritious qualities of the farina is incorporated with, and lost in the subsequent grades. By my mode there are but two qualities—the "superfine," which engrosses all the nutritious properties of the wheat, and the "residuum," the latter being all that is left after the superfine flour.

The advantages gained by my improved process of manufacturing flour in addition to those already named, are first, wet or damp wheat may be ground much easier than by the present mode, as the wheat is warmed by the first grinding and thus partially kiln dried by passing the ground wheat through the elevators, coolers, bolts, &c., so that when it is subjected to the second grinding in this partially kiln dried state, the broken particles of wheat, which escape the first grinding process, are invariably reduced to flour by the second grinding, being brittle and more easily ground. Second, the time and expense of grinding middlings are saved, the work being finished at one operation. Third, the flour is much more uniform, and bolts full 30 per cent faster than by the old modes. It is also of a better quality as the starch is not so fine and the gluten finer than before, and it also contains a much larger proportion of the latter which will have a tendency to preserve it from souring in warm weather and hot climates, and make it yield a greater amount of good bread from a given quantity of flour. Fourth, the quantity of flour is increased by catching all of the broken particles of wheat which escape in the stopping and starting of the mill and other causes and reducing them to a proper degree of fineness. Fifth, the quality of the flour is improved by the incorporation into it of more gluten and nutritious matter, and by the grinding of the gluten fine enough to bolt without getting the starch too fine. Sixth, the second grinding destroys the moisture of the farina and thereby prevents it from becoming sour. Seventh, by improved grinding, by subjecting the stuffs or offal to the second or high grinding when in a partially kiln dried state from the previous or slow grinding and airing process, and passing the "stuffs" from the upper bolts to the auxiliary stones without interruption. Eighth, the saving in bolting facilities, by having the flour ground more uniformly than by the old process and by its being drier, the regrinding process taking place when the offal is in a partially kiln dried state from the previous grinding, airing, stirring and bolting operations.

There are other advantages derived from my improved process of flouring, but the foregoing will suffice to show the importance of the discharge.

Should the wheat have been previously hulled, or unbranned, by Bentz's process, the whole quantity can be reduced to flour, thus increasing the yield still more.

The second grinding of the offal may be done after it has left the lower or return bolts and before being introduced to the dusters, should the mill be so situated as to make it more convenient.

It must be remembered that the stuffs or offal, after the regrinding are not sent back to the cooler, or first bolts, but bolted in the second bolts, and only such part of the flour thus obtained, sent back to be incorporated with the superfine flour, as the miller's judgment may dictate.

This process is applicable to "custom grinding" as well as to "flouring."

What I claim as my invention and improvement and desire to secure by Letters Patent is—

The process of regrinding the offal of wheat immediately after it has passed from the "bolts" and putting it through lower "dusters" or "bolts" and returning the flour to the "cooler" to be rebolted with the superfine flour, all by a continuous operation after the manner herein before described, so as to produce three new results: first, to get a greater quantity of superfine flour out of any given amount of wheat than is now obtained by any known method; 2nd, by exhausting the moisture from the grain to prevent the flour from becoming sour; and thirdly, to reduce the products to two kinds, superfine flour, and a final residuum or bran, increasing the former and decreasing the latter or less valiable product, all as herein fully set forth.

In testimony whereof I have hereunto signed my name before two subscribing witnesses.

D. P. BONNELL.

Witnesses:
 LUND WASHINGTON, Sr.,
 A. E. H. JOHNSON.

[FIRST PRINTED 1913.]